United States Patent

Bellware

[15] 3,688,332
[45] Sept. 5, 1972

[54] MECHANISM FOR OPENING AND CLOSING A COVER FOR A CONCEALED WINDSHIELD WIPER SYSTEM

[72] Inventor: James D. Bellware, Dayton, Ohio
[73] Assignee: General Motors Corporation, Detroit, Mich.
[22] Filed: April 7, 1971
[21] Appl. No.: 132,101

[52] U.S. Cl..............................15/250.16, 15/250.19
[51] Int. Cl...............................A47l 1/00, B60s 1/02
[58] Field of Search..........15/250.16, 250.17, 250.19

[56] References Cited

UNITED STATES PATENTS

| | | |
|---|---|---|
| 3,121,902 | 2/1964 | Massoll....................15/250.17 |
| 3,226,756 | 1/1966 | Heiler......................15/250.19 |
| 3,290,715 | 12/1966 | Heiler......................15/250.19 |
| 3,314,195 | 4/1967 | Ziegler....................15/250.19 |
| 3,619,847 | 11/1971 | Papadatos et al.......15/250.16 |

*Primary Examiner*—Peter Feldman
*Attorney*—W. E. Finken and W. A. Schuetz

[57] ABSTRACT

In a preferred form, this disclosure relates to a cover concealed windshield wiper apparatus for an automotive vehicle having a windshield which extends within a well extending transversely of the vehicle and a cover movable between a closed position in which it covers the well and an open position in which it uncovers the well. The windshield cleaning apparatus includes a pair of spaced oscillatable windshield cleaner assemblies and an actuating mechanism for oscillating the windshield cleaner assemblies between inboard and outboard positions during running operation and for parking the same in its inboard position in the well when running operation is being terminated. The actuating mechanism includes a rotary crank arm operatively connected with the windshield cleaner assemblies, a drive motor including a rotatable element and having an interruptible driving connection with the crank arm and means for establishing a driving connection between the rotatable element and the crank arm during running operation and for disestablishing the driving connection therebetween when the wiper assemblies reach their inboard position when running operation is being terminated while allowing the rotatable element to continue rotation through a given angular extent prior to de-energizing the motor, and a cover operating mechanism operatively connected with the cover and being operable in response to said rotatable element continuing its rotation to move said cover from its open position towards its closed position whereby the cover is not moved to its closed position until the wiper assemblies are in their parked position.

3 Claims, 15 Drawing Figures

INVENTOR.
James D. Bellware
BY
W. A. Schutz
ATTORNEY

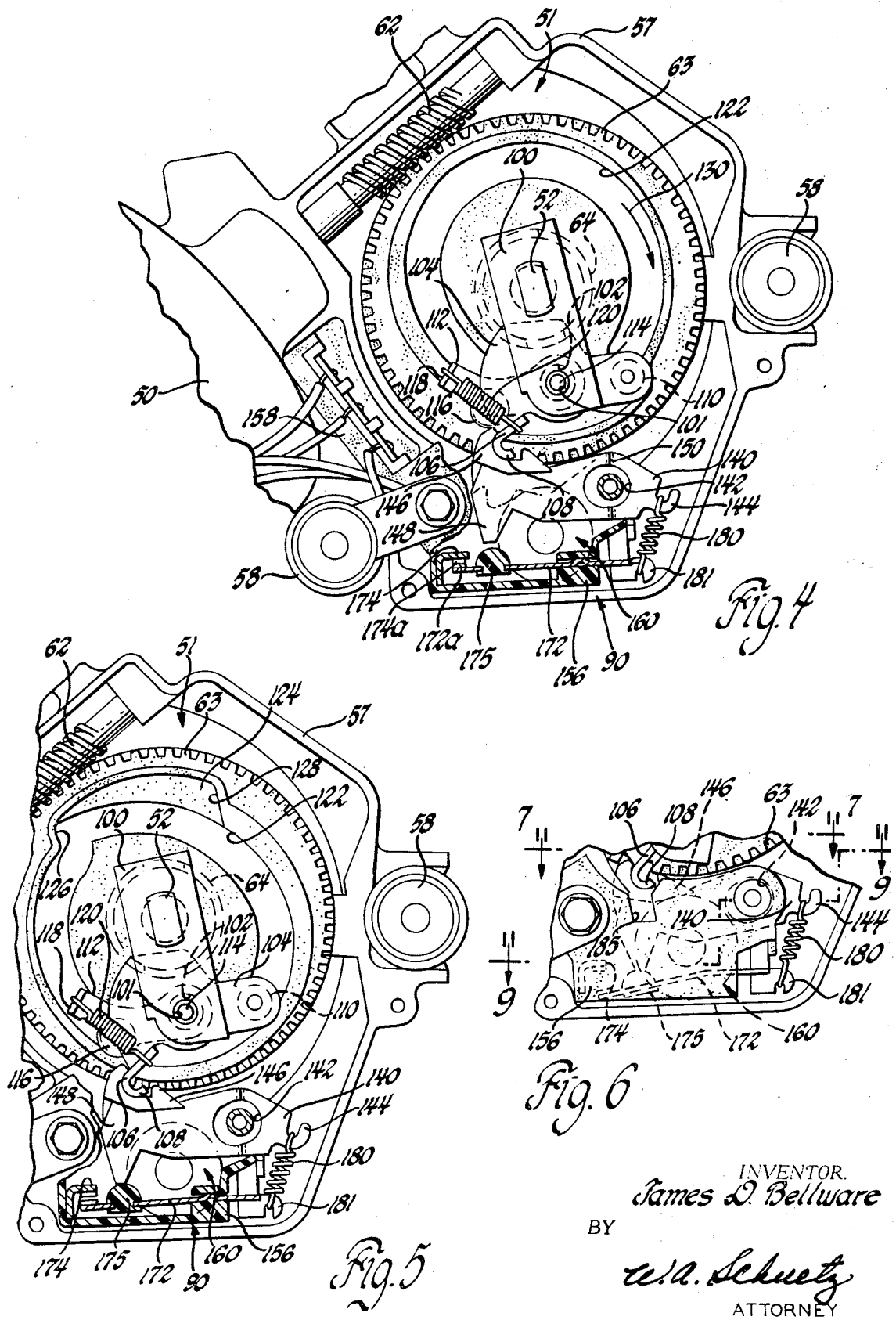

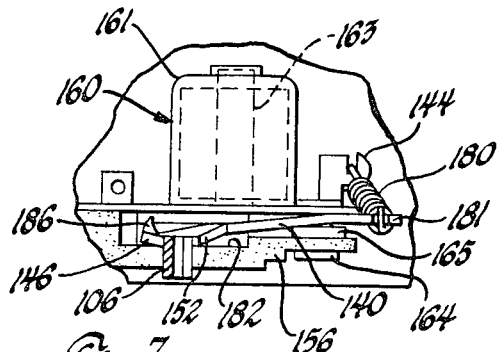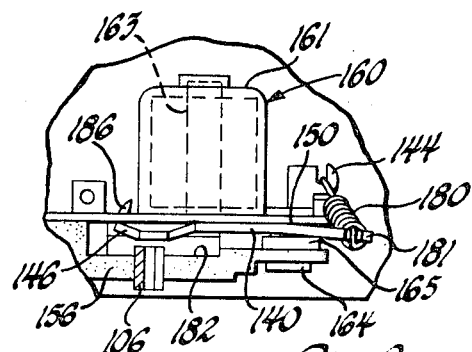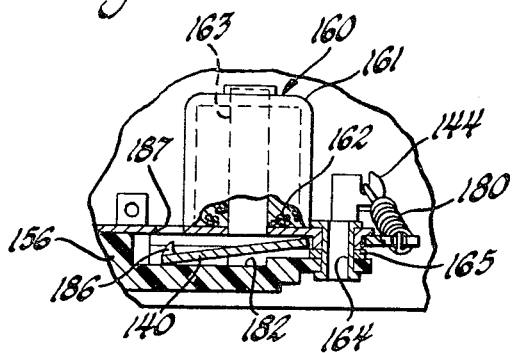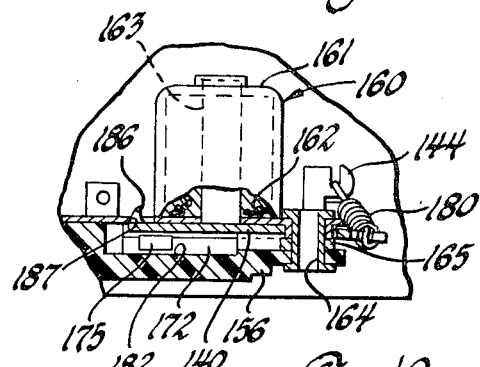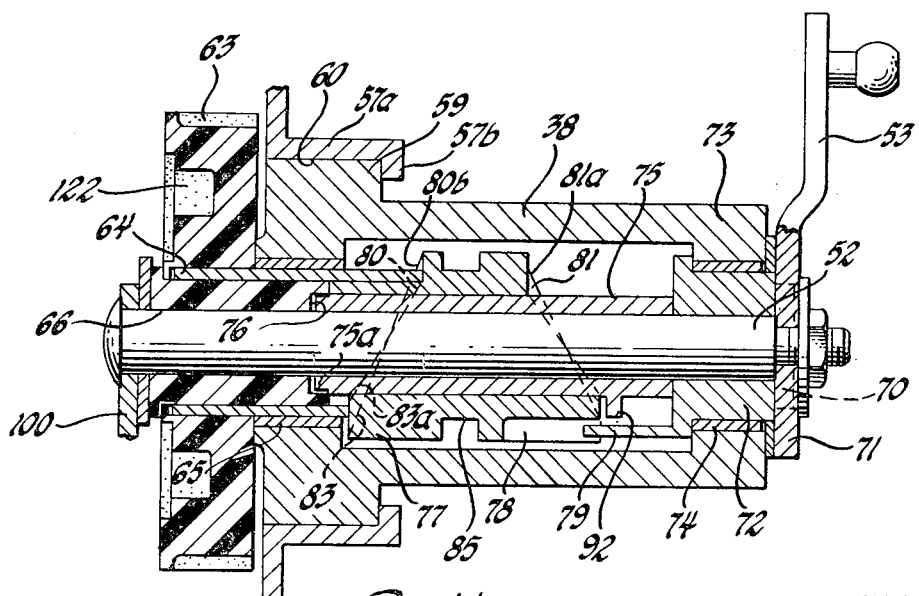

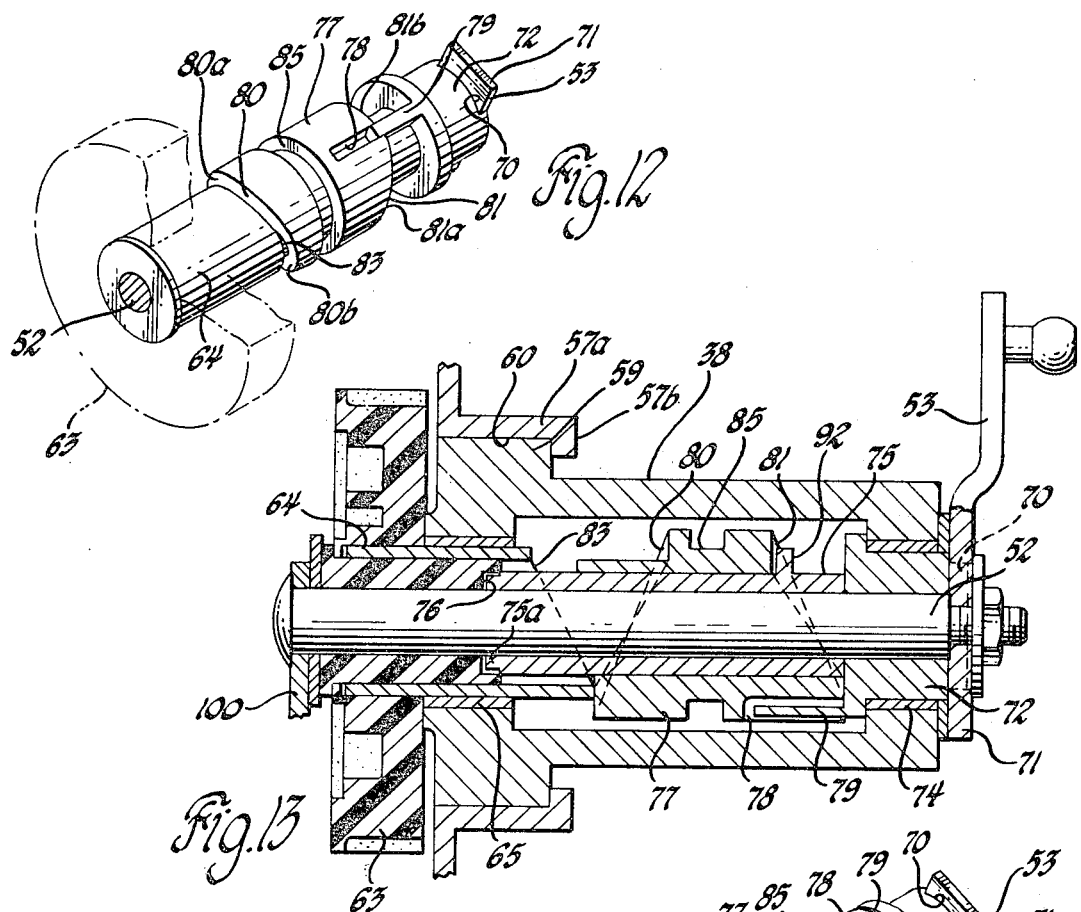
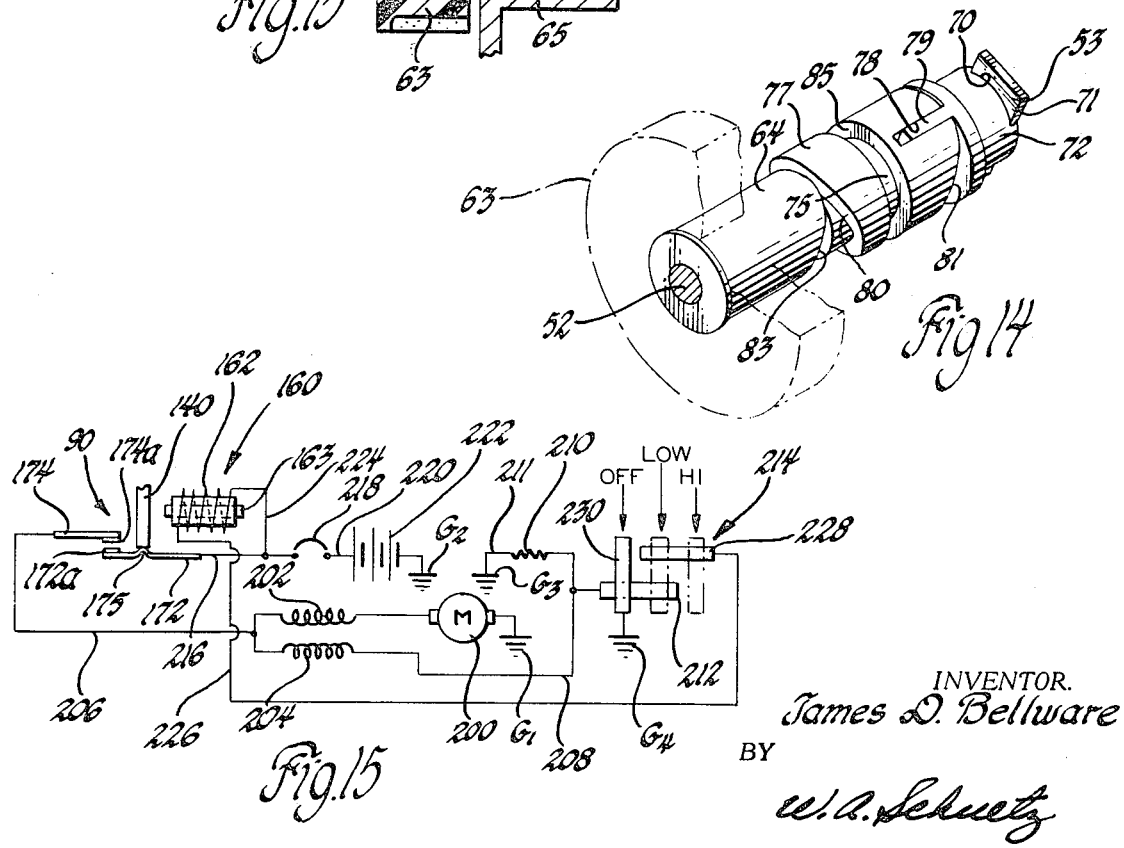

MECHANISM FOR OPENING AND CLOSING A COVER FOR A CONCEALED WINDSHIELD WIPER SYSTEM

The present invention relates to a cover concealed windshield wiper apparatus, and in particular to a cover concealed windshield wiper apparatus for wiping a windshield which extends within a well located beneath a movable cover and in which the wipers are parked on the windshield within the well at their inboard stroke end positions.

Heretofore, cover concealed windshield wiping apparatuses in which a pair of windshield wipers are concealed from view beneath a cover have been provided. These known systems have included a separate motor and drive arrangement for moving the cover between closed and open positions. Known systems have also included mechanisms which are automatically operable to move a cover to an open position in response to movement of the wipers from a depressed park position towards their inboard stroke end position. An example of the latter type of system is shown in U.S. Pat. No. 3,226,756.

The present invention provides a novel cover concealed windshield wiper apparatus having a non-depressed park windshield wiper mechanism and a cover operating mechanism for moving the cover between its closed and open positions subsequent and prior to wiper operation being terminated and initiated, respectively.

An important object of the present invention is to provide a new and improved cover concealed windshield wiping apparatus for a vehicle having a windshield which extends within a transversely extending well defined by body structure of the vehicle and a cover which is movable between closed and open positions for covering and uncovering the well, and in which the windshield wiper apparatus includes a windshield cleaner assembly for wiping the windshield and which is adapted to be oscillated between inboard and outboard positions, an actuating mechanism for oscillating the windshield cleaner assembly and which includes a rotatable output member operatively connected with the windshield cleaner assembly for oscillating the same, a drive motor including a rotatable element having an interruptible driving connection with the rotatable member and means operable to establish a driving connection between the rotatable element and rotatable output member during running operation of the windshield cleaner assembly and operable to disestablish a driving connection therebetween when running operation is being terminated and to allow the rotatable element to continue to rotate relative to the output member through a given angular extent prior to de-energizing the drive motor, and a mechanism operatively connected with the cover for moving the cover from its open position towards its closed position in response to the continued rotation of said rotatable element when said driving connection is interrupted.

Another object of the present invention is to provide a new and improved cover concealed windshield wiping apparatus, as defined in the preceding object, and in which the rotatable output member is a crank arm having one end connected to a rotary output shaft and the rotatable element comprising a tubular shaft concentric with the output shaft and which has an interruptible driving connection with the output shaft, in which the cover operating mechanism includes a shiftable collar concentric with the output shaft and which is guidably supported for linear movement, the tubular shaft and shiftable collar having adjacent end faces which are skewed with respect to their longitudinal axes, and in which the adjacent end faces of the tubular shaft and collar are in abutting engagement with each other during running operation in which the output shaft, tubular shaft and the collar are all rotated in unison, but said tubular shaft camming said collar in response to its continuing its rotation after the driving connection between the output shaft and the tubular shaft is interrupted to shift the collar to cause a cover operating mechanism to move the cover towards its closed position.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 4 is an enlarged sectional view taken approximately along line 4—4 of FIG. 2;

FIG. 5 is a view like that shown in FIG. 4, but showing different parts thereof in different positions;

FIG. 6 is a fragmentary view like that shown in FIG. 4, but showing different parts thereof in different positions;

FIG. 7 is a cross-sectional view taken approximately along line 7—7 of FIG. 6;

FIG. 8 is a view similar to that shown in FIG 7, but showing different parts thereof in different positions;

FIG. 9 is a fragmentary sectional view taken approximately along line 9—9 of FIG. 6;

FIG. 10 is a view like that shown FIG. 6, but showing different parts thereof in different positions;

FIG. 11 is a vertical cross-sectional view of part of the apparatus shown in FIG. 1;

FIG. 12 is a fragmentary perspective view of part of the apparatus shown in FIG. 11;

FIG. 13 is a view like that shown in FIG. 11, but showing different parts thereof in different positions;

FIG. 14 is a fragmentary perspective view of some of the parts shown in FIG. 13 and FIG. 15 is a schematic electrical control system for controlling operation of the apparatus of the present invention.

Figure 1:
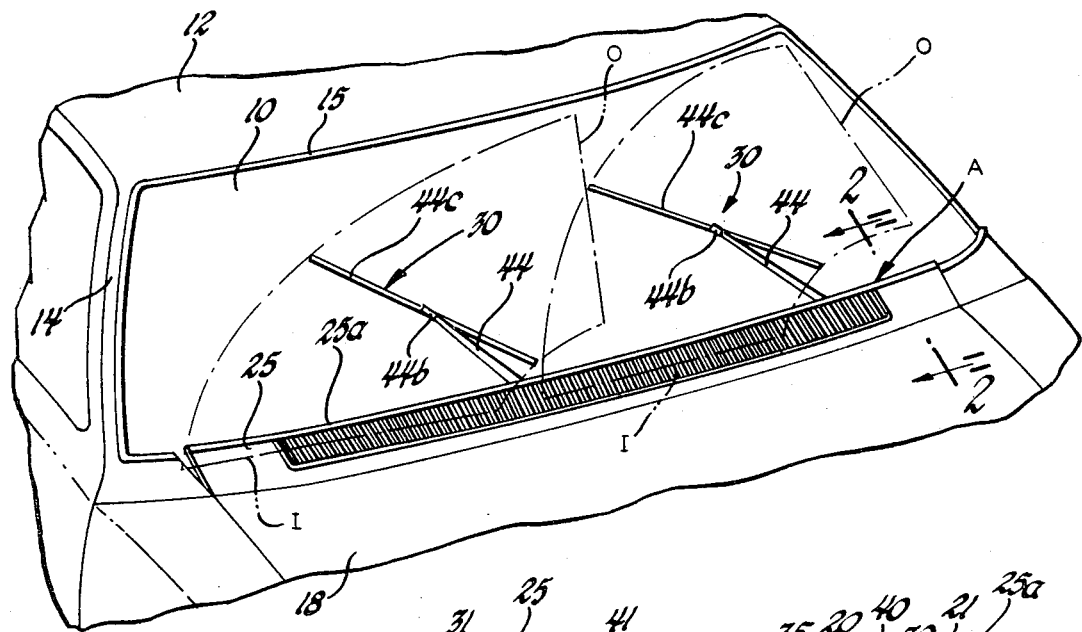
FIG. 1 is a fragmentary perspective view of an automotive vehicle embodying the novel cover concealed windshield wiping apparatus of the present invention.

As representing a preferred embodiment of the present invention, the drawings show a cover concealed windshield wiping apparatus or system A for wiping a windshield 10 of an automotive vehicle 12. The windshield 10 is supported by a suitable body structure 14 of the vehicle 12 and its outer peripheral sides and top are surrounded by a reveal molding 15. The vehicle 12 also includes a forwardly extending hood 18 which defines with the body structure 14 a well 20 extending transversely across the vehicle 12. The well has an access opening 21 at its upper end.

Figure 2:
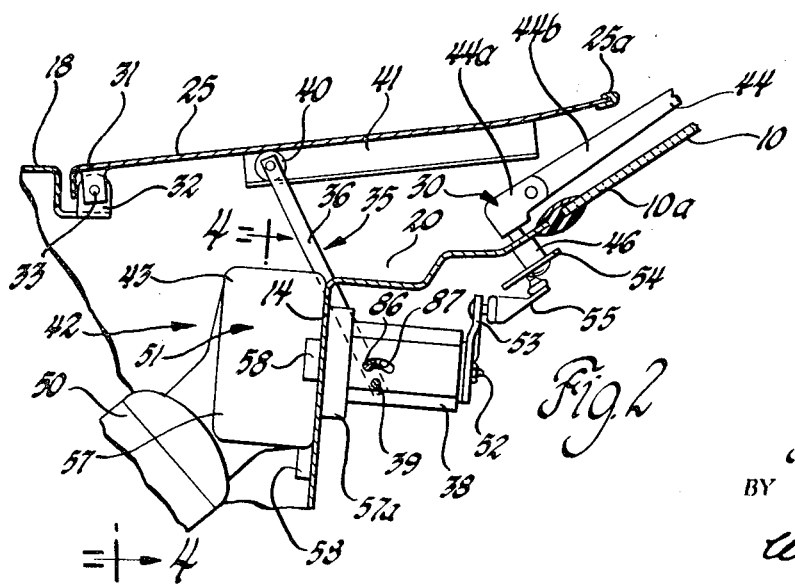
FIG. 2 is an enlarged sectional view taken approximately along line 2—2 of FIG. 1.

The access opening 21 is adapted to the either covered or uncovered by a cover 25. The cover 25 is movable between closed and open positions. When in its closed position, as shown in FIG. 2, it forms a continuation of the hood 18 and its rearward edge 25a is in engagement with the windshield 10, the windshield having a lower portion 10a which extends down into the well 20. The cover when in its open position, as shown in FIG. 2, is inclined with respect to the hood 18 and defines with the windshield 10 the opening 21 through which a pair of windshield wipers or cleaner assemblies 30 can pass. Secured to the cover 25 at its opposite side edges are the downwardly extending ears 31. The ears 31 are pivotally connected to ears 32 carried by hood 18 via pivot pin means 33.

Figure 3:
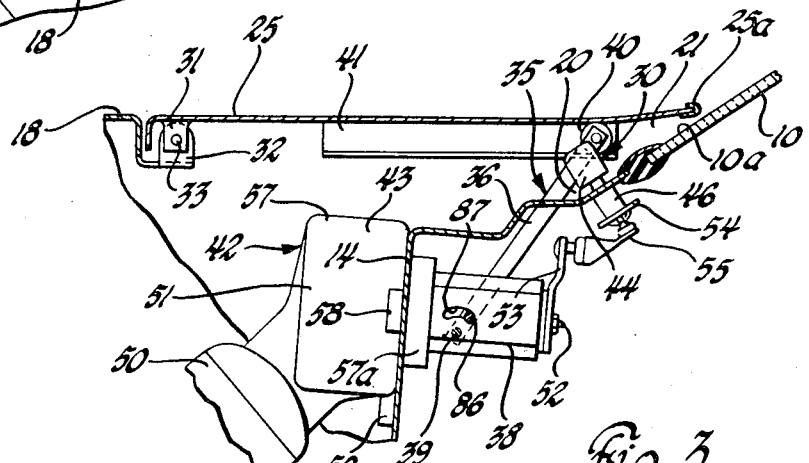
FIG. 3 is a view similar to that shown in FIG. 2 but showing different parts thereof in different positions.

The cover 25 is adapted to be moved between its closed and open positions by a cover operating mechanism 35. The cover operating mechanism 35 comprises a pair of spaced levers 36 (only one of which is shown) having their lower ends pivotally connected to a housing 38 by a pivot pin means 39. The upper ends of the levers 36 carry a roller 40 which is slidably received within a guide channel 41 secured to the underside of the cover 25. When the levers 36 are pivoted in a counter clockwise direction, the cover 25 is caused to be moved from its closed position, as shown in FIG. 2 towards its open position, as shown in FIG. 3. Likewise, pivoting the levers 36 in a clockwise direction causes the cover 25 to be moved from its open position towards its closed position. The manner in which the levers 36 are pivoted to cause the cover to be moved between its open and closed position will be described hereinafter.

The cover concealed windshield wiping apparatus A also includes a non-depressed park wiper mechanism 42 which is carried by the vehicle support means 14. The wiper mechanism 42 comprises the pair of windshield cleaner assemblies or wipers 30 and an actuating mechanism or drive means 43 for oscillating the wipers 30 across the outer surface of the windshield 10 between outboard positions, designated by the letter 0, and inboard positions, designated by the letter 1. The wipers 30 when in their inboard position I are located on the lower portion 10a of the windshield 10 and in the well 20. The inboard position of the wipers 30 is also the park position of the windshield wipers 30.

The windshield wipers 30 can be of any suitable or conventional construction and are here shown as comprising a wiper arm 44 having spring hinged connected inner and outer wiper arm sections 44a and 44b for biasing a wiper blade assembly 44c, which is carried by the outer wiper arm section 44b, against the outer surface of the wind shield 10. The inner wiper arm sections 44a are adapted to be fixedly secured to drive pivots 46, which are rotatably supported by the body structure 14 of the vehicle 12.

The drive means 43 for oscillating the wipers 30 comprises a unidirectional electric motor 50 and a gear reduction unit 51 having a rotary output shaft 52. Secured to the rotary output shaft 52 is one end of a crank arm 53, the other end of the crank arm being drivingly connected with one end of crank arms 54 fixed to the drive pivots 46 via a suitable or conventional drive linkage or transmission 55. Rotation of the crank arm 53 causes the transmission 55 to be reciprocated to oscillate the crank arms 54, which in turn causes the drive pivots 46 and the wipers 30 to be oscillated in tandem between their inboard and outboard stroke end positions.

The electric motor 50 has an end casting 57 which encloses the gear reduction unit 51. The end casting or housing 57 includes three gromet supports 58 by which the wiper actuating mechanism 43 can be attached to the support structure 14 of the vehicle 12. The end casting 57 also supports the housing 38. The housing 38 is non-circular, hollow and has an end portion 59 which is received within a complementary shaped opening 60 in an end wall portion 57a of the end casting 57. The end wall portion 57a includes a radially extending flange 57b which retains the end portion 59 of the housing 38 in the opening 60.

Referring to FIGS. 4 and 11, the speed reduction unit 51 includes a worm 62 integral with the armature shaft (not shown) of the motor 50 and which meshes with a nylon worm gear 63. The nylon worm gear 63 is bonded or otherwise fixedly secured to one end of a hollow or tubular metal shaft 64, which in turn is rotatably journaled via a sleeve bearing 65 in the end portion 59 of the housing 38. The tubular shaft 64 is concentric with the axis of the worm gear 63. The worm gear 63 has a concentric bore 66 formed therein for rotatably receiving the left end of the output shaft 52, as viewed in FIG 11. The output shaft 52 extends through the hollow housing 38 and its other end is suitably fixed to one end of the crank arm 53. The crank arm 53 is received in a non-circular recess or slot 70 in an end portion 71 of an annular member 72. The annular member 72 is rotatably journaled in the forward end portion 73 of the housing 38 via a sleeve bearing 74. Thus the output shaft 52 is rotatably journaled within the worm gear 63 and the end portion 73 of the housing 38.

Referring to FIGS. 11—14, the rotatable output shaft 52 also carries, intermediate its ends, a sleeve 75. The sleeve is rotatably journaled on the output shaft 52 and at its left end is drivingly interlocked with the hub of the nylon worm gear 63 so as to be rotatable therewith. The sleeve 75 has a pair of projections 75a which extend axially thereof and which are received within suitable notches 76 in the hub of the worm gear 63 to drivingly connect the same together. Slidably carried on the sleeve 75 is an annular collar 77. The collar 77 is slidably supported for linear movement toward and from the nylon worm gear 63. To this end, the collar 77 has an axially extending recess 78 which receives an axially extending projection 79 on the annular member 72 which prevents relative rotation therebetween. The collar 77 has left and right end faces 80 and 81 which lie in planes which intersect each other and which are skewed with respect to the longitudinal axis of the collar 77 or the output shaft 52. These end faces 80 and 81 define cam surfaces having rise and fall portions 80a, 81a and 80b and 81 b, respectively. Likewise, the hollow shaft or tube 64 at its end which projects within the housing 38 has an end face 83 which lies in a plane which is skewed with respect to the axis of the hollow tube or shaft 52. The end face 83 of a hollow shaft 64 defines a cam surface having a rise portion 83a and a fall portion 83b.

The collar 77 also has an annular peripheral groove 85 which slidably receives a pair of pins 86 (only one of which is shown in FIG. 2) which extends through arcuate slots 87 in the opposite sides of the housing 38. The pins 86 are fixed to the levers 36.

As will be described in detail hereinafter, the output shaft 52 has an interruptible driving connection with the worm gear 63. The output shaft 52 and the worm gear 63 are coupled together during running operation of the wipers 30 and the relative positions of the collar 77 and tubular shaft 64 are as shown in FIGS. 11 and 12 and the levers 36 are in the position shown in FIG. 3 in which they hold the cover 25 open. When wiper operation is being terminated and upon the wipers reaching their inboard or park position, the driving connection between the worm gear 63 and the output shaft 52 is interrupted, but the worm gear 63 continues to rotate a predetermined angular extent prior to the wiper motor 50 being de-energized. This continued rotation of the worm gear 63 causes the hollow shaft 64 to be rotated. During this continued rotation of the worm gear 63, the shaft 52, annular member 72 and collar 77 are not rotating, since the driving connection between the output shaft 52 and the worm gear 63 is interrupted. Rotation of the hollow shaft 64 relative to the collar 77 causes the rise portion 83a of the cam surface 83 to engage the rise portion 80a of the cam surface 80 on the collar 77 and effect movement of the collar 77 linearly toward the right from the position shown in FIG. 11 toward the position shown in FIG. 13 This movement of the collar 77 toward the right toward the position shown in FIG. 13 causes the pins 86 to move in a clockwise direction in the arcuate slot 87 which in turn causes the levers 36 to be moved in the clockwise direction to move the cover 25 toward its closed position. When the worm gear has substantially rotated 180° it will actuate a switch 90 to effect de-energization of the wiper motor 50. When the wipers 30 are in their parked or inboard position and the cover 25 is in its closed position the relative position of the parts are as shown in FIG. 13.

When wiper operation is initiated by energizing the wiper motor 50, the worm gear 63 is caused to be rotated which in turn rotates the metal shaft 64. Rotation of the worm gear 63 also rotates the sleeve 75. Rotation of the sleeve 75 causes a radial projection 92 thereon to engage the rise portion 81a of the cam surface 81 of the collar 77 p74 be moved toward the left from its position shown in FIG. 13 towards its position shown in FIG. 11. This movement toward the left is permitted, since the hollow shaft 64 is being rotated so that its rise portion 83a moves out of the way and toward the fall portion 80b of the cam surface 80 as the collar 77 is shifted toward the left. Movement of the collar toward the left towards its position shown in FIG. 11 causes the pins 86 to be moved in the counter clockwise direction in the arcuate slot 87 which in turn causes the levers 36 to be moved in the counter-clockwise direction and the cover 25 toward its open position. When the worm gear 63 has been rotated substantially 180°the collar 77 will be completely shifted toward the left and its cam surface 80 will be in abutting engagement with the cam surface 83 of the hollow shaft 64. When this occurs a driving connection is again established between the worm gear 63 and the output shaft 52, and in a manner to be hereinafter described. When the worm gear 63 and tubular shaft 64 are drivingly connected, the entire assembly including the collar 77 is rotated in unison and the wipers 30 are oscillated through their strokes.

From the foregoing, it should be apparent that the cover 25 is moved from its closed position towards its open position prior to operation of the windshield wipers 30 when wiper operation is initiated and that the cover 25 is moved from its open position towards its closed position subsequent to the windshield wipers 30 being positioned in their parked or inboard position. This precludes any possible interference between the windshield wipers 30 and the cover 25.

As best shown in FIGS. 4—6, the means for interrupting the driving connection between the output shaft 52 and the worm gear 63 comprises a drive plate 100 rigidly secured to the end of the shaft 52 opposite the crank arm 53. The drive plate 100 has a circular opening 101 surrounded by a shoulder 102. A drive pawl 104 has a circular aperture for receiving the shoulder 102 such that the drive pawl 104 is rotatably journaled on the drive plate 100. In addition, the drive pawl 104 is formed with an integral upstanding apertured lug 106 having a reversely bent end 108 and an integral cam follower pin 110. A lock pawl 112 has an upstanding pin 114 which extends through to the aperture in the drive pawl 104 and the aperture 101 in the drive plate 100 whereby the lock pawl 112 is pivotally supported relative to the drive plate 100. In addition the lock pawl 112 has an integral cam follower pin 116 and an upstanding apertured lug 118. The lug 106 on the drive pawl 104 and the lug 118 on the lock pawl 112 in the angular relationship depicted in FIG. 4.

The worm gear 63 has an integral cam track 122 or slot with a raised ledge section 124. The cam track 122 defines a pair of angularly spaced shoulders, or abutments, 126 and 128. In assembling the parts to the worm gear 63, the drive pawl 104 is journaled on the shoulder 102 surrounding the aperture 101 in the drive plate 100. Thereafter the lock pawl 112 is assembled with the drive plate 100 and the drive pawl 104 by inserting the pin 114 through the aligned apertures in the drive pawl 104 and the drive plate 100. Thereafter, the lugs 106 and 118 are interconnected by the tension spring 120. This subassembly is then assembled with the worm gear by inserting the crank shaft 52 through the aperture 66 ( which was previously connected to the drive plate 100) in the worm gear 63 and moving the entire assembly axially relative to the gear 63 until the cam follower pin 114 on the drive pawl 106 and the pin 116 on the lock pawl 112 are seated within the cam track 122. When the pin 110 is in engagement with the shoulder 126 of the cam track 122 and the pin 116 is in engagement with the shoulder 128, the shaft 52 is connected for rotation with the worm gear 63.

As best shown in FIGS. 4 and 5, the worm gear 63 is shown in driving engagement with the worm 62 integral with the armature shaft ( not shown) of the motor 50. When the motor 50 is energized, the worm gear 63 rotates in a clockwise direction, as indicated by the arrow 130. With the cam follower pin of the drive pawl 104 in engagement with the shoulder 126 and the cam follower pin 116 of the lock pawl 112 in engagement with the shoulder 128, rotation will be imparted to the shaft 52 about the axis of the worm gear 63.

In order to shift the collar 77 to move the cover between its positions, it is necessary to interrupt the driving connection between the shaft 52 and the worm gear 63 during continuous rotation of the latter. In so doing, the rotation of the shaft 62 is substantially arrested and continued rotation of the worm gear 63 throughout a distance of substantially 180° causes the collar 77 to be shifted from its position shown in FIG. 11 to the position shown in FIG. 13.

In order to interrupt the driving connection between the output shaft 52 and the worm gear, the actuating mechanism 43 includes the universely mounted latch 140. As best shown in FIGS. 5-10, the latch 140 comprises a steel stamping, and is formed with a substantially elliptical opening 142. It further includes a spring retaining lug 144, a hook 146 and a cam lug 148. The cam lug 148 is curved outwardly of the plane of the hook 146 as clearly shown in FIGS. 7 and 8, and the function thereof will be pointed out more particularly hereinafter. As shown FIGS. 4 and 8, the latch 140 is transversely bent along a line 150 through the center of the elliptical opening 142, and in addition the hook 146 is angularly offset as shown at 152.

Referring to FIGS. 7 and 8, the latch 140 constitutes a component of an electromagnet 160 and switch assembly 90 for controlling the interruptible driving connection between the output shaft 52 and the worm gear 63 and an energizing circuit for the motor 50. The electromagnet and switch assembly includes a plastic switch housing 156 which, as seen in FIG, 4, has an integral offset leg portion 158 on which electric terminals are mounted. The plastic housing 156 is suitably attached to the housing 57. The electromagnet 154 includes a steel shell 161, a coil 162 and a magnetizable core 163 is suitably attached to the switch assembly 90. The latch 140 is mounted for limited universal movement on a hollow rivet 164, as seen in FIG. 9, a washer 165 being interposed between a switch housing 156 and the latch 140. By virtue of the elliptical opening 142 in the latch 140 through which the cylindrical rivet 164 passes, it will be appreciated that the latch 140 is supported for limited lateral and axial movement as well as pivotal movement relative to the switch housing 156.

As best shown in FIGS. 4—6, the switch 90 for e-energizing the electric motor 50 when the cover 25 reaches its closed position is contained within the switch blade 172 carrying a contact 172a at its free end and a stationary contact 174a connected to a terminal lug 174. The leaf spring switch blade 172, intermediate its ends, carries a plastic button 175. The button 175 is engageable by the latch 140 and moved thereby to separate the contacts 172a and 174a so as to de-energize the motor 50 when the worm gear 63 is rotated substantially 180° subsequent to the drive connection being interrupted. The latch 140 is biased in a clockwise direction about its pivotal connection with the switch housing 156 via a coil spring 180, one end of which engages the lug 144 of the latch 140 and the other of which engages a lug 181 integral with the shell 161 of the electromagnet 160. In addition to biasing the latch 140 in a clockwise direction, the spring 180 urges the latch 140 toward the wall 182 of the switch housing 156 due to the angular relationship between the lugs 144 and 181. That is, the lug 144 is located above the plane of the lug 181 on the latch, as clearly shown in FIGS. 7 and 8.

The electromagnet 160 is energized in FIGS. 8 and 10 and de-energized in FIGS. 7 and 9. The latch 140, the drive pawl 104 and the switch 90 are shown in the rest position in FIG. 6. When in this position, the motor 50 is de-energized, the wipers 30 are in their inboard or parked position and the cover 25 is in its closed position. In the rest position, it will be noted that the lug 106 of the drive pawl 104 is held by the hook 146 of the latch 140 and in addition has a portion thereof situated in a guide slot 185 of the switch housing 156. The latch 140 is in engagement with the button 175 thereby deflecting the switch blade 172 so as to separate the contacts 172a and 174a. The electromagnet 160 is de-energized and accordingly the spring 180 maintains the hook end 146 of the latch 140 in engagement with the switch housing 156, as shown in FIG. 9.

Upon energization of the electromagnet the steel latch 140, which constitutes the armature of the electromagnet 160, is attracted to the core 163 as shown in FIGS. 8 and 10. A cam lug 186 of the latch 140 is disposed in a slot 187 in the electromagnet shell 161 and the latch 140 is moved out of the plane of the switch actuator 175 whereby the inherent resiliency in the leaf spring blade will cause the contact 172a to engage stationary contact 174a. In addition, the offset hook 146 of the latch 140 140 is disengaged from the lug 106 of the drive pawl 104, as is the lug 106 of the drive pawl 104, as is clearly shown in FIG. 8. The latch 140 remains in the position of FIGS. 8 and 10 as long as the electromagnet 160 is energized. However, upon de-energization of the electromagnet, the spring 180 will pivot the latch 140 and extend it outwardly into the path of movement of the latch 106 on the drive pawl 104, as shown in FIG. 4. During movement of the latch 100 by the spring 180 when the electromagnet 160 is deenergized, the cam lug 106 forces the latch 140 towards the side 182 of the switch housing 156 due to engagement of the cam lug 186 with the surface of the electromagnet shell 161 which defines the slot 187. The function of the cam lug 186 is to insure that the latch 140 will move into engagement with the switch housing 156 not withstanding any residual magnetism in the core 163 or the latch 140 when the electromagnet 160 is de-energized.

Referring to FIG. 15, a control circuitry for controlling energization and de-energization of the electric motor 50 will be described. The motor 50 includes a wound armature 200, one side of which is connected to a ground $G_1$ and the other side of which is connected to a series field winding 202 and a shunt field 204 winding. The junction between the series and shut field windings 202 and 204 is connected by a wire 206 to the stationary switch terminal 174 carrying the stationary contact 174a. The other end of the shunt field winding 204 is connected to a wire 208 having a connection with one end of a resistor 210 and a stationary contact 212 of a manual control switch 214. The resistor 210 at its other end is connected via wire 211 to ground $G_3$.

The movable switch blade contact 172a and its leaf spring 172 are connected by wire 216 through an automatic overload circuit breaker 218 and wire 220 to one terminal of a battery 222, the other terminal of which is connected to a ground $G_2$. The coil 162 of the electromagnet 160 is connected by wire 224 to the wire 216 at one end and at the other end of the coil 163 is connected by wire 226 to a stationary switch contact 228 of the manual control switch 214.

The manual control switch 214 could be of any suitable or conventional construction and includes, besides the stationary contacts 212 and 228, a movable bridging contact 230 having three positions, off, low and high. The bridging contact is connected to ground $G_4$. In the off position, the electromagnet coil 163 is de-energized. The wiper motor 50 is controlled by the switch 90 comprising contacts 172a and 174a. When the movable switch contact 230 is moved to the low speed position, the electromagnet coil 162 is energized thereby attracting the latch 140 toward the core 163 and allow the switch blade to move the actuator 175 and allow the contact 172a to engage the stationary contact 174a, due to the inherent resilient bias of the switch blade 172. Accordingly, the motor 50 will be energized for low speed operation from the battery 222, wire 220, the overload circuit breaker 218, the wire 216, leaf spring 172, switch contacts 172a and 174a, terminal 174 and wire 206 to the series field windings 202 and the armature 200 to ground $G_1$. The shunt field windings 204 energized from the wire 206, shunt field windings 204, wire 208, stationary contact 212, bridging contact 230 to ground $G_4$. When the switch contact 230 is moved to the high speed position the ground path to ground $G_4$ for the circuit for energizing the shunt field windings is broken, but the resistor 210 is connected in series with the shunt field windings 204 to reduce the energization thereof. This increases the speed of the motor 50. When the movable contact 230 is returned to the off position, the coil 162 is de-energized, but the switch 90 remains closed until the worm gear 63 has rotated a predetermined angular extent subsequent to the driving connection between the worm gear 63 and the output shaft 52 being interrupted.

With reference to FIGS. 4–15, a complete cycle of operation will be described starting from when the cover 25 is in its closed position and the wipers 30 are in their inboard or parked position and returning to that position. The actuating mechanism 43 is in the position shown in FIGS. 6, 7 and 13 when the wipers 30 are in their parked position and the cover is in its closed position. When the movable contact 230 of the manual switch 214 is moved to either the low or high speed positions the electromagnet 160 will be energized. Energization of the electromagnet 160 will attract the latch 140 and move it from the position shown in FIG. 7 to the position shown in FIGS. 6 and 8. During this movement the latch 140 will be disengaged from the switch button 175 to allow the leaf spring 172 to move the contact 172a into engagement with the stationary contact 174a to energize the motor 50. Concurrently, the hook 146 of the latch 100 will be disengaged from the lug 106 of the drive pawl 104 as shown in FIG. 8. Energization of the motor 50 will result in rotation of the worm gear 63 from the position shown in FIGS. 5 and 6 in a clockwise direction, as indicated by the arrow 130. The lug 106 of the drive pawl 104 will be withdrawn from the slot 185 in the switch housing 156 due to co-action between the follower pin 110 of the drive pawl 104 and with the cam track 122 in the worm gear 63. This occurs because the cam track 122 is contoured so as to be eccentric with the axis of the worm gear 63 and the drive and lock pawls 104 and 112 can pivot about the pivot pin 114.

During the first 180° rotation of the worm gear 63, the shaft 52 will not rotate. After 180° of rotation the follower pin 110 will engage the shoulder 126 and the spring 120 will pivot the lock pawl 112 so as to engage its follower pin 116 with the shoulder 128. When the follower pins 110 and 116 engage the shoulders 128 and 126 of the cam track 122 the drive plate 100 and hence, the shaft 52 are drivingly connected to the worm gear 63 for rotation therewith.

Also, during the relative rotation between the worm gear 63 and the shaft 52, the projection 92 on the sleeve 75 causes the annular collar 77 to be shifted leftward from the position shown in FIG. 13 toward the position shown in FIG. 11, and in a manner hereinbefore described. This movement of the collar 77 will cause the levers 36 to pivot in a counterclockwise direction to cause the cover to be moved from its closed position, as shown in FIG. 2, towards its open position, as shown in FIG. 3.

When the driving connection is established between the worm gear 63 and the output shaft 52, the output shaft 52 will be rotated. Rotation of the output shaft 52 will cause the wipers 30 to be oscillated in tandem across the outer surface of the windshield 10 between their inboard and outboard positions. If the manual switch contact 230 is in the low speed position, the wiper motor 50 will operate at low speed with the resistor 210 short circuited. On the other hand, if the movable switch contact 230 is moved to the high speed position, the resistor 210 will be connected in circuit with the shunt field windings 204 so as to cause the wiper motor to operate at high speed.

When wiper operation is no longer desired, the movable switch contact 230 is moved to the off position thereby de-energizing the electromagnet 160. When the electromagnet 160 is de-energized the spring 180 moves the latch 140 from its dotted line position of FIG. 4 to the full line position depicted therein and away from the shell 161 of the electromagnet 160 from the position shown in FIG. 8 to the position shown in FIG. 7. As alluded to hereinbefore, the cam lug 186 assists the spring 180 in urging the latch 140 towards the side 182 of the switch housing 156 as shown in FIGS. 7 and 9. When the latch 140 is moved to this position the offset hook 146 of the latch 140 will be in a position to intercept the end of the lug 106 on the drive pawl 104 when it arrives at the angular position shown in FIG. 4. The motor 50 remains energized for either low or high speed operation when the electromagnet 160 is de-energized since the switch contacts 172a and 174 remain in engagement.

When the hook 146 of the latch 140 engages the lug 106 of the drive pawl 104 during continued rotation of the worm gear 63, the pin 110 of the drive pawl 104 is cammed from engagement with the shoulder 126 and then the pin 116 of the lock pawl 112 is cammed from engagement with the shoulder 126. This interrupts the driving connection between the shaft 52 and the worm gear 63. At this time rotation of the shaft 52 is substantially arrested and the wipers 30 are in their inboard or parked position. During continued rotation of the worm gear throughout substantially 180° from the position shown in FIG. 4 toward the position shown in FIG. 5, the collar 77, whose rotation is also arrested since rotation of the annular member 72 and crank arm 53 is arrested, is caused to be shifted toward the right from its position shown in FIG. 11 to its position shown in FIG. 13, and in a manner hereinbefore described. This will cause the cover 25 to be moved from its open position, as shown in FIG. 3, toward its closed position, as shown in FIG. 2. During the relative rotation of the worm gear 63 and the shaft 52, it will be appreciated that the drive pawl 104 and its lug 106 will move radially outwardly due to the eccentricity of the cam track 122 thereby effecting a counterclockwise pivotal movement of the latch 140 from the solid line position of FIG. 4 to the position shown in FIG. 6. Since the latch 140 is biased away from the shell 161 of the electromagnet 160 it is now aligned with the switch actuator 175. Thus, the latch 140 will engage the actuator 175 to separate the switch contacts 172a and 174a when the worm gear 63 has been rotated 180° to the position shown in FIG. 5 so as to de-energize the motor 50 and arrest rotation of the worm gear 63.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A cover concealed windshield wiping apparatus for an automotive vehicle having a windshield, a support structure for supporting the windshield and which defines a well adjacent the lower end of the windshield and a cover supported for movement between closed and open positions in which it covers and uncovers said well, respectively, said apparatus comprising an oscillatable windshield wiper for wiping the windshield and which is adapted to be parked within the well beneath the cover when not operating; an actuating mechanism for oscillating said windshield cleaner assembly, said actuating mechanism including a rotatable member operatively connected with the windshield wiper for oscillating the same, a drive motor including a rotatable element having an interruptible driving connection with said rotatable member and means operable to establish a driving connection between said rotatable element and member during running operation of the windshield wiper and operable to disestablish the driving connection therebetween when running operation is being terminated and allow said rotative element to continue to rotate relative to said rotatable member through a given angular extent prior to de-energizing said drive motor, and a cover operating mechanism operatively connected with said cover for moving said cover from its open position towards its closed position in response to said continued rotation of said rotatable element when said driving connection is interrupted.

2. A combined windshield wiping and cover operating apparatus for use with an automotive vehicle having body structure which defines a well extending transversely of the vehicle, a windshield supported by said body structure and having its lower portion extending within said well, and a cover supported by said vehicle body structure for movement between closed and open positions in which it covers and uncovers said well, respectively, said apparatus comprising: a windshield cleaner assembly which is adapted to be supported by the body structure for oscillatory movement between inboard and outboard positions and with the inboard position being located within said well, an actuating mechanism for oscillating said windshield cleaner assembly and for parking the same in its inboard position, said actuating mechanism including a rotatable output member operatively connected with said wiper assembly for oscillating the same, a drive motor including a rotatable element having an interruptible driving connection with said output member and means for establishing a driving connection between said rotatable element and said output member during running operation and for disestablishing the driving connection therebetween when said wiper assembly reaches its inboard position when running operation is being terminated while allowing said rotatable element to continue to rotate through a given angular extent prior to de-energizing the drive motor, and a cover operating mechanism operatively connected with said cover and being operable in response to said rotatable element continuing its rotation to move said cover from its open position toward its closed position whereby said cover is not moved to its closed position until said wiper assembly is in its inboard park position.

3. A combined windshield wiping and cover operating apparatus for use with an automotive vehicle having a body structure, which defines a well extending transversely of the vehicle, a windshield supported by said body structure and having its lower portion extending within said well, and a cover supported by the support structure for movement between closed and open positions in which it covers and uncovers said well, said apparatus comprising: a windshield cleaner assembly which is adapted to be supported by the body structure for oscillatory movement between inboard and outboard positions and with the inboard position being located within said will, an actuating mechanism for oscillating said windshield cleaner assembly between its positions during running operation and for parking the same in its inboard position when running operation is being terminated, said actuating mechanism including a rotatable crank arm operatively connected with said windshield wiper assembly, a drive motor, a rotatable output shaft having one end thereof secured to said rotatable crank arm, a tubular shaft surrounding said rotatable output shaft and which is drivingly connected with said motor, said tubular shaft having an end face lying in a plane which is skewed with respect to the longitudinal axis of the tubular shaft, said end face defining a cam surface having a rise portion and a fall portion, a collar surrounding said output shaft and supported for linear movement longitudinally thereof, aid collar having an end face adjacent said tubular shaft which is skewed with respect to its longitudinal axis and which defines a cam surface having a rise and fall portion, a linkage means operatively connected with said cover and said slidable collar for moving said cover between its positions in response to said collar being linearly moved relative to the output shaft, and means for establishing a driving connection between said tubular shaft and said output shaft during running operation and for disestablishing the driving connection therebetween when said wiper assembly reaches its inboard position when running operation is being terminated while allowing said tubular shaft to continue to rotate through a given angular extent prior to de-energizing the drive motor, said tubular shaft when rotated relative to said output shaft having the rise portion of its cam surface engaging in the rise portion of the cam surface of the collar to cause the collar to be linearly moved relative to the output shaft whereby the cover is caused to be moved from its open position towards its closed position subsequent to the windshield cleaner assembly being parked in its inboard position.

* * * * *